May 30, 1967 K. SIEGRIST 3,322,370
LINE CONTROL MECHANISM FOR A SPINNING REEL
Filed May 12, 1964 2 Sheets-Sheet 1

INVENTOR
KARL SIEGRIST

May 30, 1967 K. SIEGRIST 3,322,370
LINE CONTROL MECHANISM FOR A SPINNING REEL
Filed May 12, 1964 2 Sheets-Sheet 2
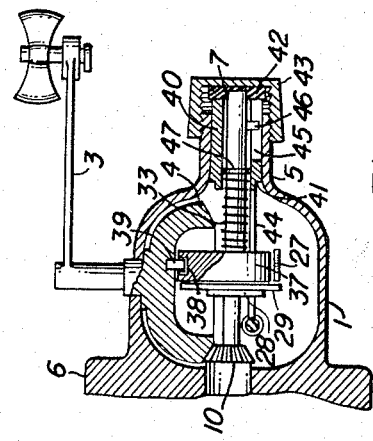
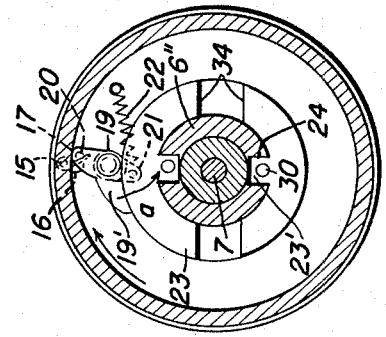
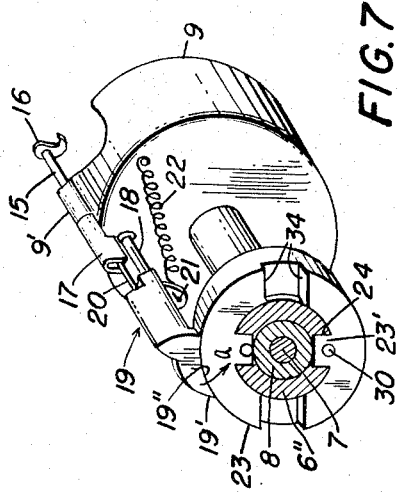
INVENTOR
KARL SIEGRIST United States Patent Office 3,322,370
Patented May 30, 1967

3,322,370
LINE CONTROL MECHANISM FOR A
SPINNING REEL
Karl Siegrist, Bombachhalde 22, Zurich,
Switzerland
Filed May 12, 1964, Ser. No. 366,859
Claims priority, application Switzerland, June 21, 1963,
7,711/63
6 Claims. (Cl. 242—84.21)

This invention relates to a fishing reel of the casting type for use on rods, in which an almost frictionless take-off of the fishing line is obtainable and thus a length of throw considerably greater than with the fishing reels known heretofore, while accurate placing of the bait at a definite distance is also possible when required.

According to the invention this is achieved in that a line catcher arranged on the periphery of a rotor mounted on the spindle of the reel spool lies on the periphery of that spool close above the wound-up line and is swivelable about an axis parallel to the reel spindle into the catching and releasing positions, the line catcher being in operative relationship with a switch member which gyrates with the rotor and in turn coacts with an axially guided and displaceable control member that can be actuated with a trigger by way of a stop fixed to the spool spindle, the trigger—which effects the advance of the spindle through an advance lever acting on the stop—serving to brake the fishing line at the end of the trigger path.

The accompanying drawing shows by way of example one embodiment of the invention.

In the drawing:

FIG. 2 is a cross-section taken on the line II—II of FIG. 1;

FIG. 7 is a perspective rear view of the forward part of the assembly; and

FIG. 8 is a cross-sectional view taken on the VIII—VIII of FIG. 1.

Figure 3:
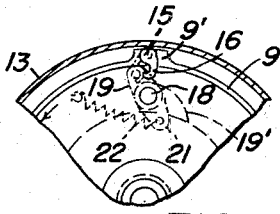
FIG. 3 is a part-sectional view on the line III—III of FIG. 1 with the spool removed and with the line catcher in the catching position.
Figure 5:
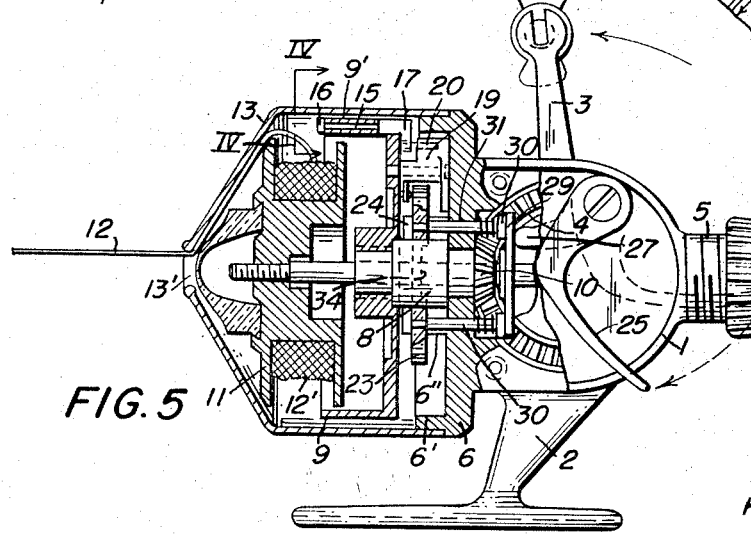
FIG. 5 is an axial section of the fishing reel when the line is being drawn off during a cast.

The fishing reel shown comprises the usual gear casing 1 with a foot 2, in which is supported a bevel-gear type drive pinion 4 rotatable by a crank 3. Axially displaceably mounted within a rearward bearing extension 5 of casing 2 and in a bearing plate 6 closing same to the front is a spindle 7 which runs at right angels to the axis of pinion 4. Also supported within the bearing plate 6 and secured against axial displacement is a hollow shaft 8 which carries a rotor 9 and through which the main spindle 7 passes. The hollow shaft 8 has mounted thereon a bevel wheel 10 which meshes with pinion 4. Screwed onto the threaded projection 7' of the spindle 7 is a spool 11 with a fishing line 12 wound thereon in the form of a cross-wound coil 12'. The line 12 runs from the spool 11 through a central opening 13' of a line-guide bell 13 which is fitted on an extension 6' of bearing plate 6 by means of a bayonet union. Attached to the side of spool 11 facing the opening 13' is an elastic hollow braking member 14 which can be pressed against the central opening 13' by displacement of the spindle 7, thus permitting the line 12 being drawn off spool 11 during a cast to be braked for the purpose of placing the bait at a desired distance. Rotor 9 is designed as a drum open to the front and accommodating the spool 11. In a thickened portion 9' of the rotor periphery, a line catcher shaft 15 carrying a hook-shaped finger 16 is rotatably supported parallel to the spool spindle 7; shaft 15 carries on its projecting forward end a line-catcher hook 16 and at its rear end a forked lever 17. An axle pin 18 fixed to rotor 9 has a switch member 19 swivelably mounted thereon. The switch member 19, from which a pin 20 offset from the pivotal axis defined as pin 18 projects forwardly into engagement with the bifurcate lever 17, comprises a lug 19' resting against the periphery of a control disk 23 as a follower thereof. An arm 21 of member 19, which is directed towards the spindle 7, is engaged by a tension spring 22 which tends to turn the member 19 in the sense of the arrow a in FIGS. 2 and 7 so as to press the lug 19' with its accurate surface 19'' against the circumference of control disk 23, thus swinging the line catcher hook 16 into its release position, as is apparent from FIG. 2. Control disk 23 is axially displaceably mounted on a hub 6'' of bearing plate 6 and engages axial slots 24 thereof by means of inwardly projecting teeth 23' which secure the disk against rotation. When the control disk 23 is pushed forwardly into the position illustrated in FIG. 5, the lug 19' is deprived of its bearing surface, so that the switch member 19 swivels about the fulcrum 18, located beyond the periphery of disk 23, in the sense of the arrow a in FIGS. 2 and 7. Consequently the line catcher 15, 16, 17 is swung in the opposite direction by the coupling 20, 17 and thus brings the hook 16 into its release position, as shown in FIG. 3.

Axial displacement of control disk 23 is effected by a manual actuator designed as a trigger 25 which is rockably supported on the side of casing 1 opposite crank 3, in a removable cover of the casing, and carries on the inside of the casing an advance lever 27 mounted on its shaft. The lever 27 bears on a stop 29, which is mounted on spindle 7 and secured against axial displacement relative to the spindle by a circlip 28, and in which the spindle 7 can rotate freely. Stop 29 cooperates with two push rods 30 which are mounted with their forward ends fixed in the control disk 23, pass through bores 31 in bearing plate 6 and carry within casing 1 compression springs 32 whose front ends abut against bearing plate 6 and whose rear ends rest against the heads of the push rods 30.

Figure 4:
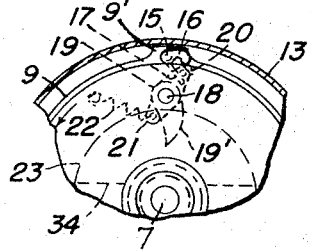
FIG. 4 is a part-sectional view corresponding to FIG. 3, with the line catcher in the release position, taken on the line IV—IV of FIG. 5.

On pressing the trigger 25 forwardly, the stop 29 together with spindle 7 is pushed towards outlet 13' by advance lever 27 against an action of the compression spring 33 arranged on the spindle. At the end of this advance movement, stop 29 presses the push rods 30 forwardly against the action of their springs 32 and entrains the control disk 23, whereby the lug 19' of switch member 19 loses its bearing surface and is swung inwardly behind the control disk 23 under the action of the tension spring 22. In this way the hook 16 is swung into its release position, as can be seen from FIGS. 4 and 5. The advance movement of reel spindle 7 resulting from pressing the trigger 25 forwardly is limited by the braking member 14 coming up against the central opening 13' of the line-guide bell 13, whereupon increased pressure applied to trigger 25 produces a progressive braking pressure which is transmitted to the fishing line 12.

Figure 1:
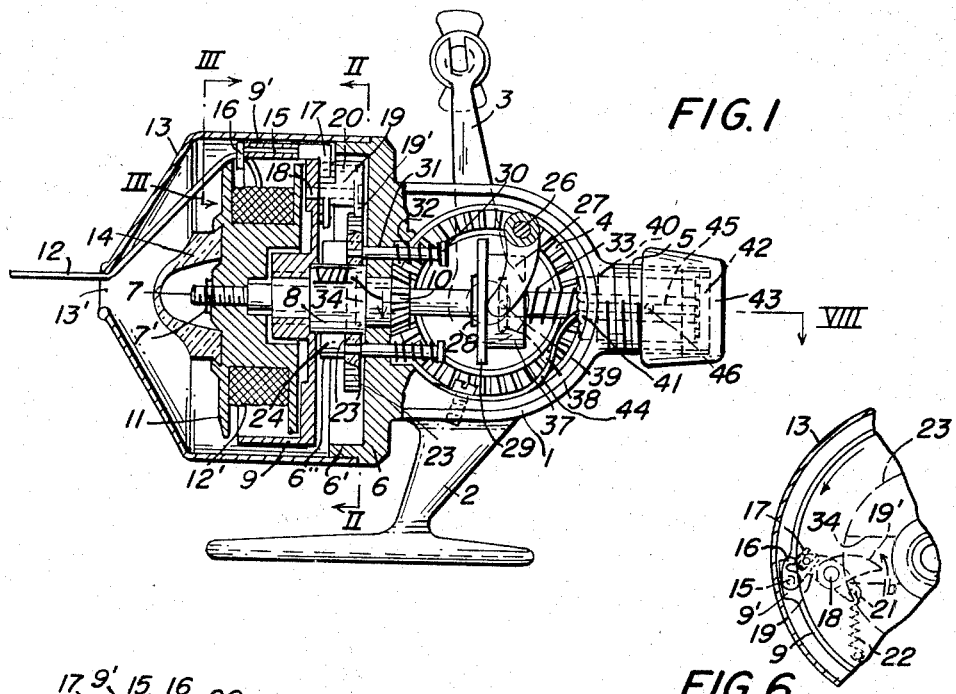
FIG. 1 is an axial section of the fishing reel during winding-up of the line.
Figure 6:
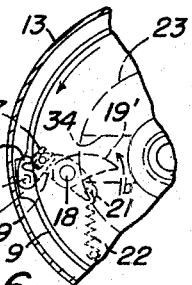
FIG. 6 is a cross-section corresponding to FIG. 4, immediately prior to the return of the line catcher to the catching position.

The return of hook 16 to its catching position, as shown in FIGS. 1, 2, and 7 is made possible by recesses 34 arranged on the rear side of control disk 23; upon operation of rotor 9 by means of crank 3, the lug 19' is caught in one of the recesses 34 of control disk 23, which is subject to the axial pressure of compression springs 32, and is thus cammed outwardly in the sense of the arrow b in FIG. 6. This permits control disk 23 to return from its forward position shown in FIG. 5 to its initial or retracted position according to FIG. 1, whereupon lug 19' again bears on its contact surface, thus securing hook 16 in its operative or catching position.

Reel spindle 7 is subject to the axial pressure of the compression spring 33 mounted thereon, whose rear end rests against a bearing ring 47 mounted on the reel spindle 7 within bearing extension 5, and whose forward end rests against a coupling element 37 rotatably supported on spindle 7. This carrier lies with its flat side, turned away from the advance lever, against a flat side face of pinion 4, being provided on that face with a groove 38 which extends transversely to spindle 7 and receives a crank pin 39 eccentrically fixed to pinion 4. When pinion 4 is turned by means of crank 3, a reciprocatory shifting movement is imparted to element 37 disposed between stop 29 and compression spring 33 in axially slidable relationship with spindle 7, such said movement producing the cross winding of line 12 on spool 11.

It will be noted from FIG. 1 that the eccentricity of crank pin 39 with reference to the axis of crank 3 equals approximately half the normal distance between abutment 29 and the push rods 30 which extend rearwardly from control disk 23, the range of axial reciprocation of abutment 37, spindle 7 and spool 11 being thus no greater than the idle stroke length of the lost-motion connection 29, 30 whereby the cross winding of line 12 on spool 11 may proceed without dislodgment of disk 23 and, therefore, without an inward movement of the follower 19' which would withdraw the hook-shaped catching element 16 from the path of the line.

Numeral 40 designates a locking sleeve (see also FIG. 8) which is rotatably mounted within bearing extension 5, has at its forward end locking teeth 41 and rests with its rear end against a preferably elastic washer 42 of a tightening nut 43 designed as a cap. The locking teeth 41 cooperate with the end of a locking spring 44 which is attached on the inside of casing 1. The locking sleeve 40 is provided with a longitudinal slot 45 in which a carrier pin 46 passing transversely through the spindle 7 engages. On tightening the nut 43, the locking sleeve 40 is displaced in the direction of the locking spring 44, thus increasing the braking action exerted against unwinding of the line 12 from spool 11 on spindle 7 as the trigger 25 is pressed to advance the spindle 7 to the limit of its adjustable stroke. Owing to the location of the brake control within the rear bearing 5 of the spindle, easy regulation of the line brake 14 during turning of the crank while fishing is possible.

The slight friction on unreclining the line is mainly due to the improved cross winding obtainable with the line catcher hook 16. This improved cross winding is achieved because the hook 16, owing to its particular arrangement on rotor 9, lies as close as possible to the peripheral surface of the wound coil 12'.

The trigger 25 serves not only for swinging the hook 16 into its release position but also for actuating the line brake 14 when placing the bait at the desired distance. The line brake is actuated by pressing the trigger 25 to the end of its path, thus pressing the brake member 14 against the opening 13' of housing wall 13. Increased pressure on trigger 25 also permits progressive line braking.

I claim:

1. A spinning reel for fishing rods, comprising a housing provided with an outlet, an axially fixed hollow shaft rotatably journaled in said housing in substantial alignment with said outlet, a spindle slidably received in said shaft, a brake member on said spindle confronting a part of said housing in the vicinity of said outlet, a spool fixed to said spindle, a rotor surrounding said spool and fixed to said shaft, a control member in said housing positioned for axial movement between an advanced and a retracted position, line-catching means carried on said rotor and operatively coupled with said control member for movement between a first position in the path of a line running from said spool through said outlet and a second position withdrawn from said path, a manually operable actuator on said housing for axially displacing said spindle from a normal withdrawn position to an off-normal forward position whereby said brake member is brought into proximity with said part for clamping said line therebetween, a lost-motion coupling connecting said spindle with said control member for movement of said control member to said advanced position whereby said line-catching means begins to move toward said second position upon partial forward displacement of said spindle, and mechanism for rotating said shaft to wind said line on said spool and to reciprocate said spindle and said spool within the limits of the idle stroke length of said lost-motion coupling whereby said line-catching means remains in said first position.

2. A spinning reel as defined in claim 1 wherein said line-catching means comprises a follower engageable with said control member, a line-engaging element coupled with said follower for joint swinging in planes transverse to the axis of said spindle, and biasing means normally maintaining said follower in engagement with said control member.

3. A spinning reel as defined in claim 2 wherein said control member is a disk non-rotatably surrounding said shaft and provided with a peripheral surface having at least one radial recess, said follower including a lug receivable in said recess upon a movement of said disk from said advanced position to said retracted position, said lug having a fulcrum beyond said peripheral surface and a curved edge so shaped that said lug is cammed out of said recess for engagement with said peripheral surface upon a return of said disk to said retracted position and concurrent rotation of said rotor by said mechanism.

4. A spinning reel as defined in claim 3 wherein said line-catching means further comprises a first coupling member rigid with said lug and pivotable about a first axis parallel to that of said rotor, a spring on said rotor anchored to said first coupling member and biasing said lug towards a generally radial position with reference to said disk, and a second coupling member rigid with said line-engaging element eccentrically engaging said first coupling member while being pivotable on said rotor about another axis parallel to said first axis.

5. A spinning reel as defined in claim 1 wherein said lost-motion coupling comprises an abutment on said spindle, a rearward extension of said control member spacedly confronting said abutment, and spring means bearing upon said extension for biasing said control member into its retracted position.

6. A spinning reel as defined in claim 5 wherein said mechanism includes a crank having an axis transverse to said spindle, further comprising a coupling element rigid with said spindle and eccentrically connected with said crank for axially reciprocating said spindle together with said spool within a range limited by the separation of said abutment from said extension.

References Cited

UNITED STATES PATENTS

| 3,074,664 | 1/1963 | Beger | 242—84.2 |
| 3,107,876 | 10/1963 | Ament | 242—84.21 |
| 3,126,167 | 3/1964 | Ide | 242—84.2 |

FOREIGN PATENTS 958,408  9/1949  France.

FRANK J. COHEN, Primary Examiner.

BILLY S. TAYLOR, Examiner.